(12) United States Patent
Larsen et al.

(10) Patent No.: US 8,079,424 B2
(45) Date of Patent: Dec. 20, 2011

(54) METHOD AND APPARATUS FOR MULCHING STUBBLE

(76) Inventors: Richard James Larsen, Cowra (AU);
David Larsen, Cowra (AU)

(*) Notice: Subject to any disclaimer, the term of this patent is extended or adjusted under 35 U.S.C. 154(b) by 0 days.

(21) Appl. No.: 12/717,951

(22) Filed: Mar. 5, 2010

(65) Prior Publication Data

US 2011/0214404 A1 Sep. 8, 2011

(51) Int. Cl.
*A01B 17/00* (2006.01)
*A01B 49/00* (2006.01)

(52) U.S. Cl. ......................................... 172/515; 172/142

(58) Field of Classification Search ............... 111/52–62, 111/134–137, 66–71, 139–149, 157, 163–169, 111/190–196, 20–22; 172/572, 570, 573, 172/142–146, 196, 611, 776, 514–516, 155–160
See application file for complete search history.

(56) References Cited

U.S. PATENT DOCUMENTS

| | | | | |
|---|---|---|---|---|
| 1,261,150 A * | 4/1918 | Mountjoy | ..................... | 172/515 |
| 1,565,676 A * | 12/1925 | Sandman | ..................... | 172/514 |
| 3,061,018 A * | 10/1962 | Olson | ......................... | 172/139 |
| 3,826,315 A * | 7/1974 | Blair | ............................ | 172/514 |
| 4,452,315 A * | 6/1984 | Swanson | ....................... | 172/29 |
| 4,492,272 A * | 1/1985 | Jensen | ........................... | 172/178 |
| 2008/0173220 A1 * | 7/2008 | Wuertz | .......................... | 111/22 |

* cited by examiner

*Primary Examiner* — Robert Pezzuto
(74) *Attorney, Agent, or Firm* — Michael Molins

(57) ABSTRACT

An apparatus and method for cutting post-harvest crop stubble. The apparatus including, a support frame, a plurality of layover bars coupled to the frame for laying over the stubble, and a plurality of cutting discs for cutting the stubble. The layover bars being adapted to present a substantially smooth transitioned engagement to the stubble.

19 Claims, 7 Drawing Sheets

METHOD AND APPARATUS FOR MULCHING STUBBLE

FIELD OF THE INVENTION

The present invention relates to agriculture and in particular to soil cultivation.

The invention has been developed primarily as a method and apparatus for cutting post-harvest crop stubble and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

OBJECT OF THE INVENTION

It is an object of the present invention to overcome or ameliorate at least one of the disadvantages of the prior art, or to provide a useful alternative.

It is an object of the invention in its preferred form to provide a method and apparatus for cutting post-harvest crop stubble.

SUMMARY OF THE INVENTION

According to an aspect of the invention there is provided an apparatus for cutting post-harvest crop stubble, the apparatus including:
 a support frame;
 a plurality of layover bars coupled to the frame for laying over the stubble; and
 a plurality of cutting discs for cutting the stubble.

Preferably, each of the layover bars is associated with a respective one of the cutting discs. In use, the layover bars preferably precede the cutting discs and are angled sideward across the path of the cutting discs such that stubble can be laid over and cut by the cutting discs. In use, the layover bars preferably precede the cutting discs and are angled sideward across the path of the cutting discs such that the layover bars first engage the stubble and further forward movement of the layover bars directs the stubble to one side, thereby laying over the stubble.

Preferably, the layover bars are pivotally coupled to the frame. In use, the layover bars are preferably biased by gravity to a downward operative position. In use, a first layover bar, is preferably pivotally coupled to the frame such that engagement of the first layover bar with an unyielding feature located on the ground temporarily pivots the first layover bar upward. More preferably, each of the layover bars is releasablly coupled to the frame. Most preferably, each of the layover bars transition from a coupling to the frame downwardly and away from a direction of travel during use, such that a substantially smooth transitioned engagement can be presented to the stubble.

Preferably, the cutting discs are substantially circular. More preferably, each of the cutting discs is orientated to respectively define substantially parallel planes, such that in use they come into to cutting engagement with laid over stubble. More preferably, cutting disc angle is adjustable. Most preferably, cutting disc downward pressure is adjustable.

Preferably, each of the cutting discs is rotateably coupled to the frame. More preferably, each of the cutting discs is self sharpening. Most preferably, the cutting discs are each coupled to a pivot arm of the frame. The pivot arm being preferably biased to a downward operative position, for enabling engaging cutting contact between each of the cutting discs and the ground during use. The pivot arm being preferably adapted to temporarily pivot upwardly, upon engagement of a first cutting disc with an unyielding feature on the ground. Cutting disc downward pressure is preferably adjustable. Cutting disc downward pressure is preferably adjustable by hydraulic depth control across the width of the machine.

Preferably, the apparatus includes a plurality of wheels coupled to the frame for supporting the frame during use. The relative height of the coupling of the layover bars to the wheels is preferably adjustable. The relative height of the cutting discs to the wheels is preferably adjustable. More preferably, during use, the relative height of the cutting discs to the wheels is preferably set such that the cutting discs penetrate the ground for enabling cutting of the stubble.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Referring to the figures, there is disclosed an embodiment apparatus 100 for cutting post-harvest crop stubble. The apparatus includes: a support frame 110; a plurality of layover bars 120 coupled to the frame for laying over the stubble; and a plurality of cutting discs 130 for cutting the stubble. It will be appreciated that the apparatus is suitable for laying over and cutting straw stubble.

Figure 1:
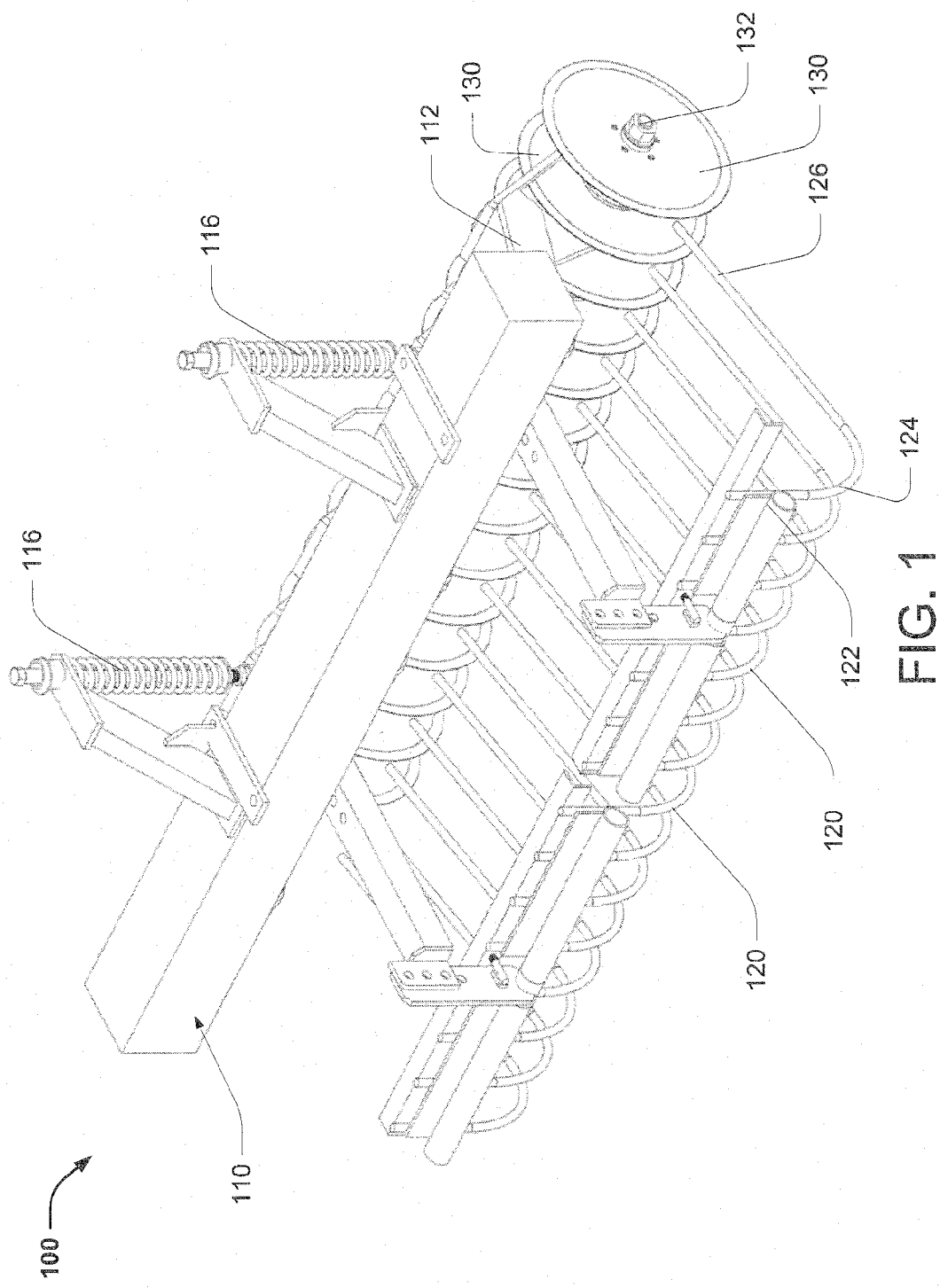
FIG. 1 is a front perspective view of an apparatus for cutting post-harvest crop stubble according to the invention.
Figure 2:
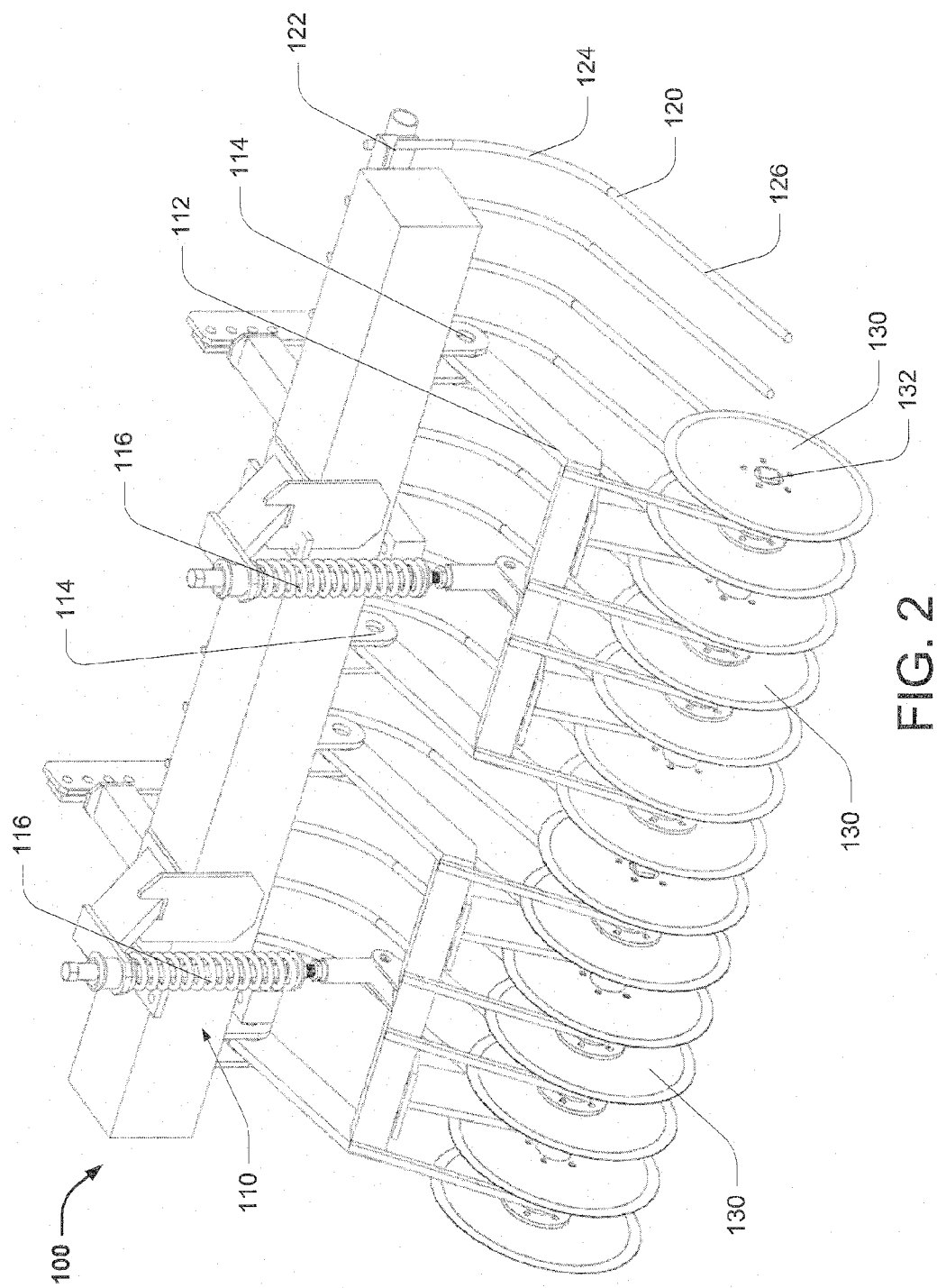
FIG. 2 is a rear perspective view of the apparatus of FIG. 1.

FIGS. 1 though 4 show, an embodiment apparatus 100 for cutting post-harvest crop stubble. The frame 110 is adapted for towing behind (or being pulled by) a tractor, or similar heavy machinery. It would be appreciated that alternative means of moving the apparatus may be used.

In this embodiment, each layover bars 120 is associated with a respective one of the cutting discs 130. However, as the purpose for the layover bars is to lay the stubble over across the path of the cutting discs, and as that the spacing of the cutting discs determine the typical cut length of the stubble, a different ratio (or association) may be used between layover bars and cutting discs. It will be appreciated that, the purpose for the layover bars is to lay the stubble over across the path of the cutting discs, and that the layover bars need not specifically cross the path of the cutting discs or comprise a 1:1 ratio between the layover bars and the cutting discs.

By way of example, each of the layover bars 120 has a leading arcuate portion 124 and a substantially straight trailing portion 126. Each layover bars 120 is further angled sideward, with respect to the apparatus intended direction of travel, across the path of the cutting discs.

In use, the layover bars 120 preferably precede the cutting discs, and are angled sideward across the path of the cutting discs, wherein the layover bars first engage the stubble such that forward movement of the layover bars directs the stubble to one side, thereby laying over the stubble. The stubble is laid over and cut by the cutting discs. The layover bars preferably transition—from their coupling to the frame—downwardly and away from an intended direction of travel during use, such that a substantially smooth transitioned engagement can be presented to the stubble.

Figure 3:
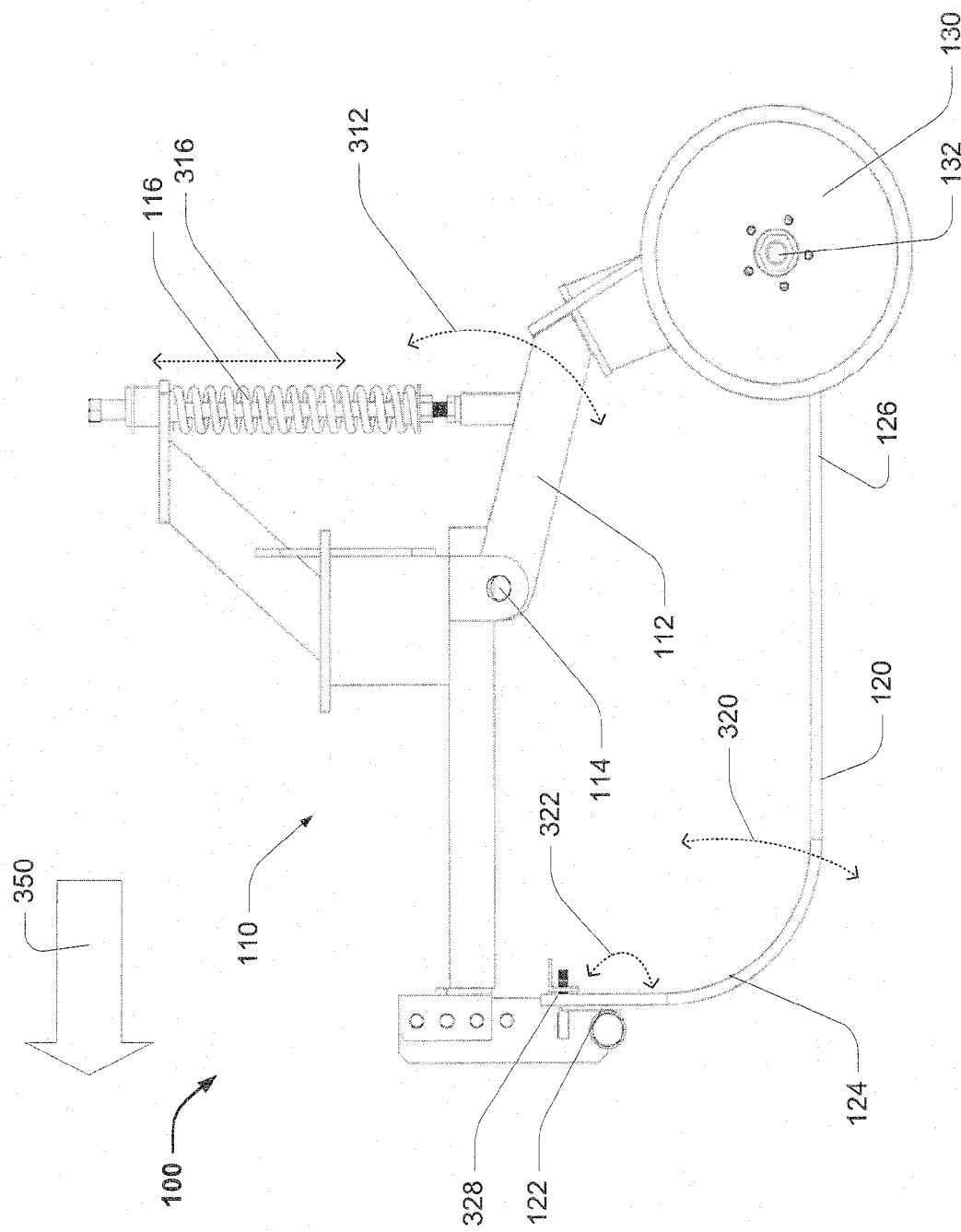
FIG. 3 is a side view of the apparatus of FIG. 1.
Figure 4:
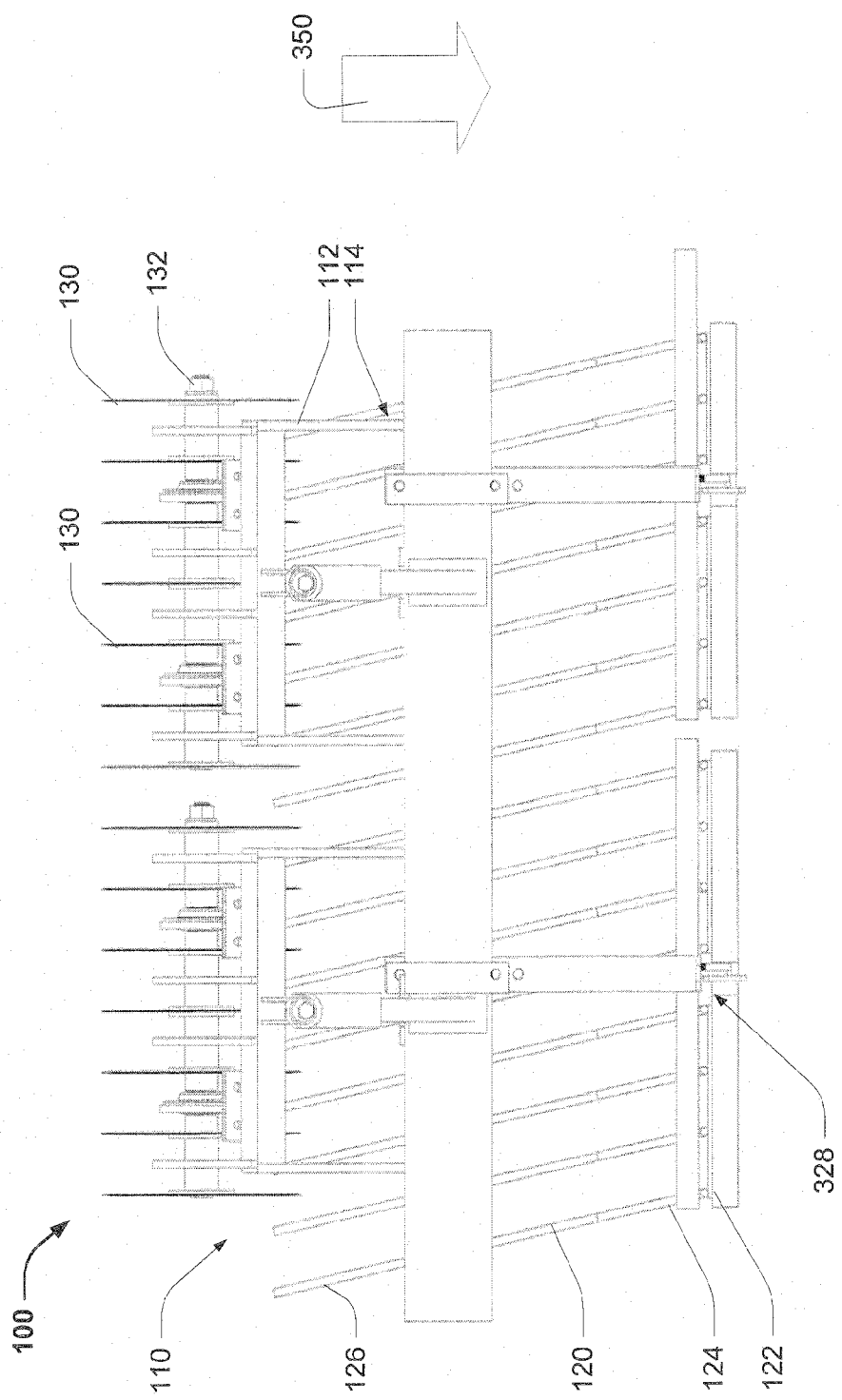
FIG. 4 is a plan view of the apparatus of FIG. 1.

By way of example, each of the layover bars 120 are pivotally coupled 122 to the frame 110, and are biased by gravity to a downward operative position. As best shown in FIG. 3, when used in an intended direction 350, this pivotal coupling and bias enables the layover bars to temporarily pivot upward 320 and 322 (with respect to the frame) when it come in contact with an unyielding feature (not shown) located on the ground. Each of the layover bars can be releasablly coupled to the frame for facilitating replacement upon damage or excessive wear.

In this embodiment, each of the cutting discs 130 are substantially circular, and are orientated in a substantially parallel planes—such that in use they come into to cutting engagement with laid over stubble. Cutting disc angle can be adjusted along with the downward pressure applied for cutting. Each cutting disc 130 is rotatably mounted to the frame 110 by a fixing 132. The cutting discs can be self sharpening.

By way of example, the cutting discs 130 are coupled to a pivot arm 112 of the frame 110. The pivot arm pivots about a pin 114 and being biased to a downward operative position by a compression spring 116. The bias further enables improved cutting engagement between the cutting disc and the ground during use. As best shown in FIG. 3, the pivot arm adapted to temporarily pivot upwardly 312 (against the bias 316) upon engagement of a cutting disc with an unyielding feature (not shown) on the ground. Cutting disc downward pressure is thereby adjustable by setting the bias force exerted by the compression spring 116. Cutting disc downward pressure can be adjusted by hydraulic depth control across the width of the machine.

Figure 5:
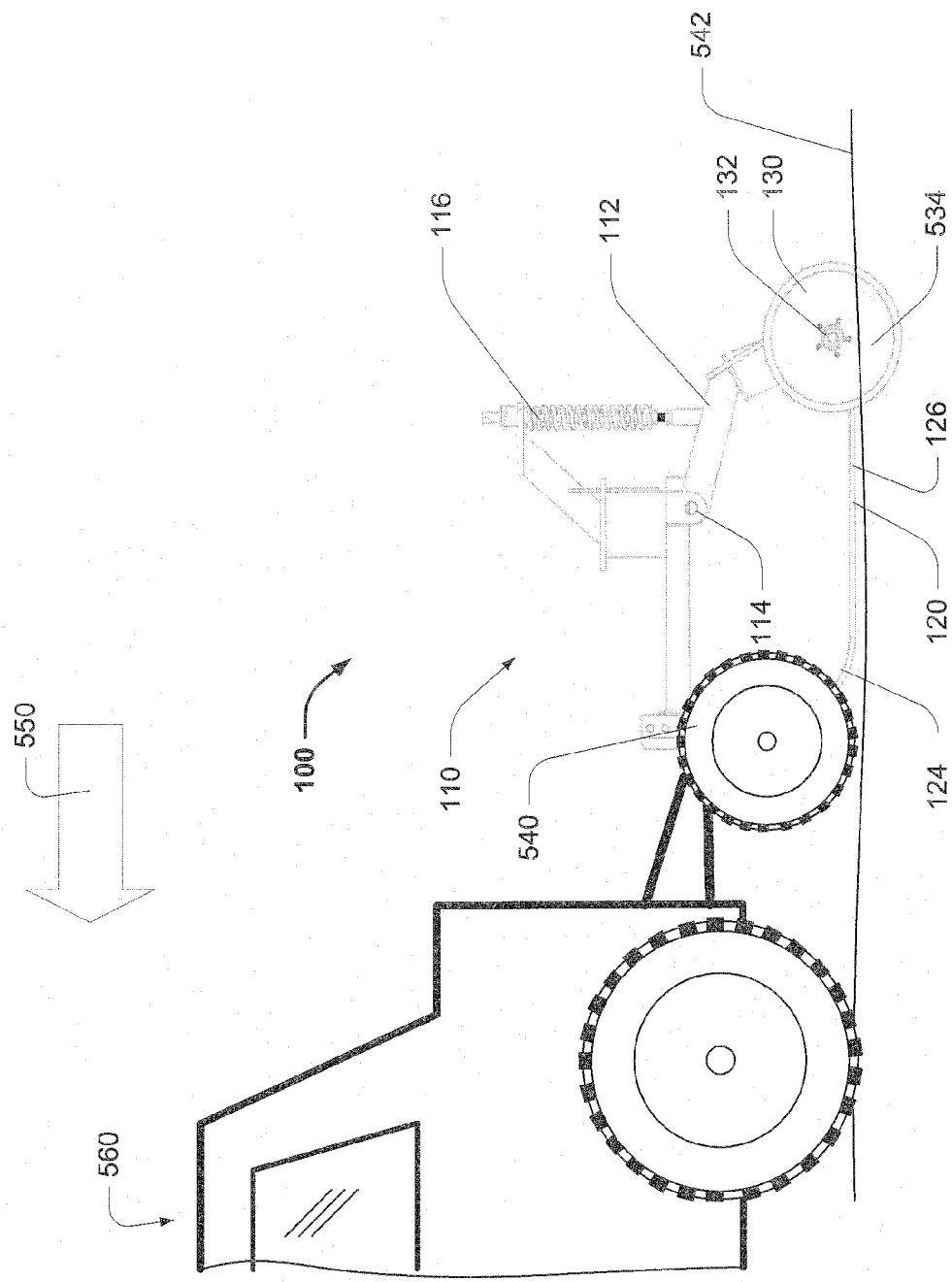
FIG. 5 is a side view of the apparatus of FIG. 1, shown attached to a tractor.
Figure 6:
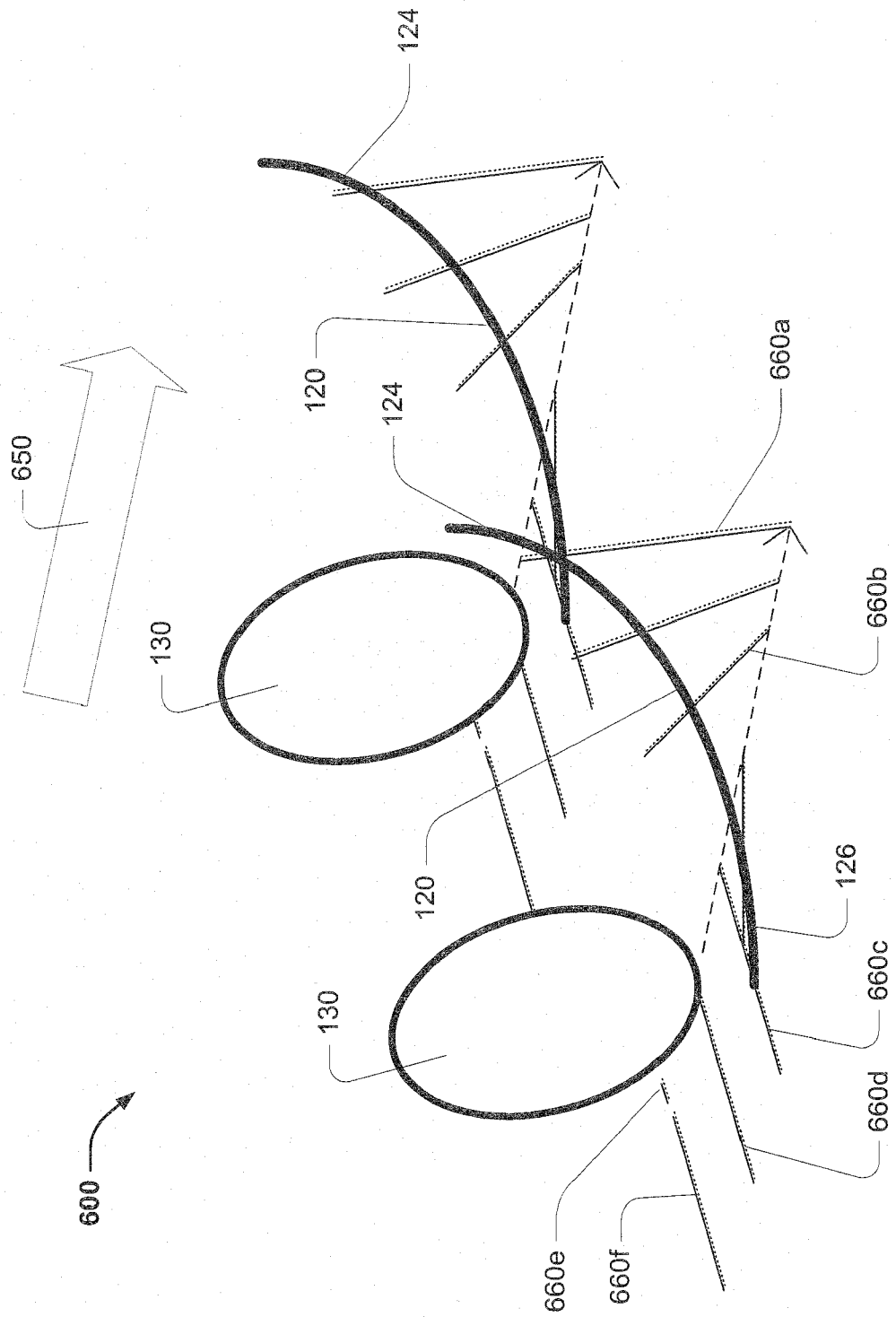
FIG. 6 is a perspective schematic view of the apparatus of FIG. 1, shown laying over and cutting of post-harvest crop stubble.

FIG. 5 and FIG. 6 show an embodiment apparatus 100 in use, being towed by a tractor 560 in an intended direction (indicated by arrow 550). The apparatus includes a plurality of wheels 540 that engage the ground 542 in a conventional manner, for enabling the apparatus to move along the ground while maintaining a height there above. The height of the frame above the ground is set such that a layover bar 120 (typically the and substantially straight trailing portion 126) moved across (above or proximal to or in contact with) the ground, and a portion 534 of the cutting disc 130 penetrates the ground for improved cutting of stubble. The relative height of the coupling of the layover bars to the wheels can be adjusted or set. The relative height of the cutting discs to the wheels is also preferably adjustable. During use, the relative height of the cutting discs to the wheels is preferably set such that the cutting discs penetrate the ground for enabling cutting of the stubble.

Figure 7:
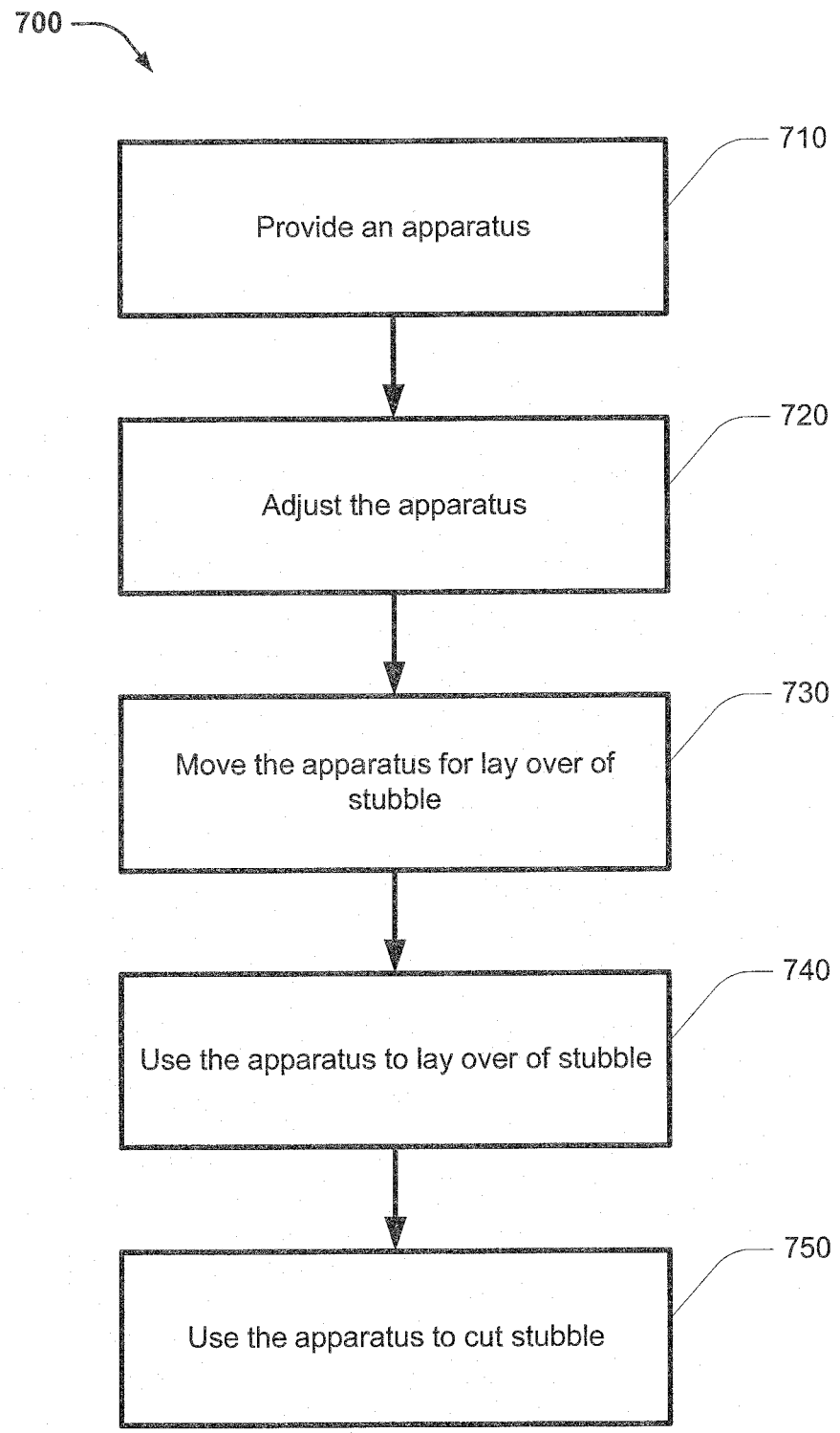
FIG. 7 is a flowchart for a method of cutting post-harvest crop stubble according to the invention.

FIG. 6 shows a is a perspective schematic 600 of the apparatus 100 laying over and cutting of post-harvest crop stubble. In this embodiment, the apparatus is being moved in the direction 650. The layover bars 120 preferably precede the cutting discs, and are angled sideward across the path of the cutting discs 130. The layover bars can first engage the stubble (at 660a) such that forward movement of the layover bars directs the stubble to one side (at 660b), thereby ultimately laying over the stubble (at 660c). The stubble being laid over (at 660d) is then cut (at 660e and 660f) by the cutting discs. The layover bars, while being angled sideward across the path of the cutting discs, preferably transition downwardly and away from a direction of travel during use 650, such that a substantially smooth transitioned engagement can be presented to the stubble. The cutting disc can be spacing across the direction of travel to enable the stubble to be cut and segmented such that a relatively evenly distribution of cut stubble segments FIG. 7 shows an embodiment flowchart 700 for a method of cutting post-harvest crop stubble, as herein described. The method comprises the steps of:

STEP 710: providing an apparatus (for example apparatus 100) as herein described;
STEP 730: move the apparatus in an intended direction for cutting post-harvest crop stubble;
STEP 740: using the apparatus for laying over the stubble;
STEP 750: using the apparatus for cutting the stubble.

By way of example only, the method can include adjusting or setting (STEP 720) any one or more of the following:
cutting disc angle;
cutting disc spacing;
cutting disc downward pressure;
relative height of the layover bars;
relative height of the cutting discs; and
relative height of the frame.

In an embodiment, by way of example only, any one or more of the following set of configurable features may be user adjustable. Similarly, in an alternative embodiment, by way of example only, any one or more of the following set of configurable features may be factory set (i.e. not adjustable).
cutting disc angle;
cutting disc spacing;
cutting disc downward pressure;
relative height of the layover bars;
relative height of the cutting discs; and
relative height of the frame.

In an embodiment, by way of example only, the apparatus lays stubble across the front of one or more self-sharpening cutting disc (or coulters), wherein the stubble is cut by the discs in situ, and thereby left relatively evenly distributed across the soil surface. A 130 mm disc spacing can be used to enable a relatively evenly distribution of cut stubble segments across the soil surface. It will be appreciated that relatively low soil compaction occurs during this method of operation. The cutting discs have an adjustable cutting angle, down pressure and cutting depth (typically using hydraulic depth control). The discs can be adjusted to enable a full cut-out of weeds at a shallow depth as well as straight-line cutting.

It will be appreciated that the illustrated apparatus can provide hydraulic depth control across the width of the machine, with adjustable disc angle and down pressure. The result of using the apparatus can provide that more post-harvest crop stubble (or trash) is cut and remains evenly distributed, which can significantly reduced fire risk. The illustrated apparatus is suitable for management of post-harvest straw stubble.

There are significant advantages in using the disclosed apparatus and a method of operation thereof. These advantages can include any one or more of the following:
the disclosed apparatus lays stubble to one side;
stubble is cut and/or bruised in short lengths with self-sharpening discs;
stubble is relatively evenly distributed across the soil surface, with relatively low soil disturbance;

stubble crown remains in the soil, which can facilitate stubble retention and reduced risk of wind erosion;

cut stubble can improve soil moisture retention;

cut stubble can improve organic matter in the soil;

cut stubble can reduce fertilizer and chemical costs;

It will be appreciated that the illustrated apparatus can also provide any one or more of the following benefits:

relatively simple, fast and efficient management of post-harvest crop stubble (or trash);

relatively low energy (about 7 to 9 kw/m on level country) requirements;

results in a relatively low soil disturbance;

provides a relatively even distribution of trash;

provides conditions for relatively low wind erosion.

It will be appreciated that the illustrated apparatus cuts post-harvest crop stubble for mulching. A method of cutting post-harvest crop stubble is also disclosed.

Although the invention has been described with reference to specific examples, it will be appreciated by those skilled in the art that the invention may be embodied in many other forms.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus for cutting post-harvest crop stubble, the apparatus including:
   a support frame;
   a plurality of cutting discs for cutting the stubble;
   a plurality of layover bars pivotally coupled to the frame for laying over the stubble, wherein the plurality of layover bars precede the cutting discs and are angled sideward across the path of the cutting discs; such that in use a first layover bar engages a first stubble directing this first stubble to one side and lays this first stubble over for cutting by a first cutting disc; and wherein one or more of the plurality of layover bars is adapted to temporarily rotatably-pivot with respect to the frame upon respective engagement with an substantially unyielding feature located on the ground.

2. A method of cutting postharvest crop stubble, the method including the steps of:
(a) providing an apparatus according to claim 1;
(b) moving the apparatus in an intended direction for cutting postharvest crop stubble; and
(c) wherein moving the apparatus causes laying over of the stubble and cutting of the stubble;
wherein the plurality of layover bars precede the cutting discs and are angled sideward across the path of the cutting discs; such that in use a first layover bar engages a first stubble directing this first stubble to one side, and lays this first stubble over for cutting by a respective one of the cutting discs; and
wherein, in use, one or more of the plurality of layover bars are each adapted to temporarily independently-rotatably-pivot with respect to the frame upon respective engagement with an substantially unyielding feature located on the ground.

3. The apparatus according to claim 1, wherein:
each layover bar is associated with a respective one of the cutting discs.

4. The apparatus according to claim 1, wherein:
the plurality of layover bars are each independently-pivotally coupled to the frame; and
in use, a second layover bar temporarily pivots upward upon engagement with an unyielding feature located on the ground.

5. The apparatus according to claim 4, wherein:
the layover bars are biased by gravity to a downward operative position.

6. The apparatus according to claim 1, wherein:
each of the layover bars transition downwardly toward the cutting disc; and
such that in use a substantially smooth transition engagement is presented to the stubble.

7. The apparatus according to claim 1, wherein:
the cutting discs are substantially circular, and are each orientated to respectively define substantially parallel planes.

8. The apparatus according to claim 7, wherein:
a cutting disc angle is adjustable.

9. The apparatus according to claim 7, wherein:
a cutting disc downward pressure is adjustable.

10. The apparatus according to claim 7, wherein:
each of the cutting discs is self sharpening.

11. The apparatus according to claim 1, wherein:
the frame comprises a pivot arm;

a second cutting disc being rotatably coupled to the pivot arm; and
such that in use the cutting disc temporarily pivots upward upon engagement with an unyielding feature located on the ground.

12. The apparatus according to claim 1, wherein:
relative height of the layover bars to the cutting disc is adjustable.

13. The apparatus according to claim 1, wherein:
relative height of the cutting disc can be adjusted;
such that in use the cutting discs penetrate the ground for enabling cutting of the stubble.

14. The apparatus according to claim 1, the apparatus further comprising a tow coupling for enabling towing by a tractor.

15. The method according to claim 2, the method further including the step of adjusting the apparatus.

16. The method according to claim 2, wherein adjusting the apparatus can include any one or more of the set comprising:
adjusting cutting disc angle;
adjusting cutting disc spacing;
adjusting cutting disc downward pressure;
adjusting relative height of the layover bars;
adjusting relative height of the cutting discs; and
adjusting relative height of the frame.

17. An apparatus for cutting post-harvest crop stubble, the apparatus including:
a support frame;
a plurality of layover bars pivotally coupled to the frame for laying over the stubble; and
a plurality of cutting discs for cutting the stubble;
wherein the cutting discs are substantially circular, and are each orientated to respectively define substantially parallel planes;
wherein the layover bars precede the cutting discs and are angled sideward across the path of the cutting discs, such that in use a first layover bar engages a first stubble, directs this first stubble to one side, and lays this first stubble over for cut by the cutting discs; and
wherein, in use, one or more of the plurality of layover bars is adapted to temporarily rotatably-pivot with respect to the frame upon respective engagement with an substantially unyielding feature located on the ground.

18. The apparatus according to claim 17, wherein:
the layover bars are each independently-pivotally coupled to the frame; and
such that in use a second layover bar temporarily pivots upward upon engagement with an unyielding feature located on the ground.

19. The apparatus according to claim 17, wherein:
the frame comprises a pivot arm;
a second cutting disc being rotatably coupled to the pivot arm; and
such that in use the cutting disc temporarily pivots upward upon engagement with an unyielding feature located on the ground.

* * * * *